United States Patent [19]
Lehman et al.

[11] Patent Number: 6,114,698
[45] Date of Patent: Sep. 5, 2000

[54] DOMAIN ENGINEERED FERROELECTRIC OPTICAL RADIATION DETECTOR

[75] Inventors: John Henry Lehman; John Andrew Aust, both of Boulder, Colo.

[73] Assignee: The United States of America as represented by the Secretary of Commerce, Washington, D.C.

[21] Appl. No.: 09/016,561

[22] Filed: Jan. 30, 1998

Related U.S. Application Data

[60] Provisional application No. 60/036,409, Jan. 31, 1997.

[51] Int. Cl.⁷ .................................................. G01J 5/10
[52] U.S. Cl. ............................................... 250/338.3
[58] Field of Search ................................. 250/338.3

[56] References Cited

U.S. PATENT DOCUMENTS

| | | |
|---|---|---|
| 3,453,432 | 7/1969 | McHenry . |
| 4,110,616 | 8/1978 | Porter et al. . |
| 4,224,521 | 9/1980 | Fisher . |
| 4,441,023 | 4/1984 | Doctor et al. . |
| 4,532,424 | 7/1985 | Cheung . |
| 4,542,294 | 9/1985 | Tamura et al. . |
| 4,598,163 | 7/1986 | Ito . |
| 4,629,319 | 12/1986 | Clarke et al. . |
| 4,792,682 | 12/1988 | Endou et al. . |
| 4,920,385 | 4/1990 | Clarke et al. . |
| 4,943,800 | 7/1990 | Ikeda et al. . |
| 4,963,741 | 10/1990 | McMullin . |
| 4,967,082 | 10/1990 | Cooke et al. . |
| 5,756,263 | 5/1998 | Gupta et al. ............... 430/317 |

FOREIGN PATENT DOCUMENTS

| | | | |
|---|---|---|---|
| 56-60324 | 5/1981 | Japan | .......... 250/338.3 |
| 56-157824 | 12/1981 | Japan | .......... 250/338.3 |
| 59-120831 | 7/1984 | Japan | .......... 250/338.3 |

*Primary Examiner*—Constantine Hannaher
*Attorney, Agent, or Firm*—Cochran & Collins

[57] ABSTRACT

A pyroelectric detector with significantly reduced microphonic noise sensitivity that includes a pyroelectric detector element constructed from a z-cut $LiNbO_3$ and $LiTaO_3$ electret. Selective domain reversal is accomplished in the electret by applying an electric field. Electrodes are attached to either surface of the electret spanning the domain reversed region and a portion of the original domain region to create areas of equal and opposite sensitivity. The detector is mounted in an electrically grounded container or housing. The detector may also be constructed having multiple detector regions to accomodate resonant frequencies of the electret or to function as a position sensor.

22 Claims, 9 Drawing Sheets

DOMAIN ENGINEERED FERROELECTRIC OPTICAL RADIATION DETECTOR

REFERENCE TO RELATED APPLICATIONS

This application claims priority from U.S. provisional application Ser. No. 60/036,409 filed Jan. 31, 1997.

FIELD OF INVENTION

This invention relates to a pyroelectric optical radiation detection apparatus, and more particularly to a pyroelectric detector constructed from a single electret in which the spontaneous polarization is selectively reversed to optimize acoustic nulling and/or modify spatial responsivity to enable position sensing.

BACKGROUND OF THE INVENTION

In the past, attempts have been made to reduce the unwanted microphonic signal in pyroelectric detectors by mechanical design, electrical design, or both. A mechanical design places the electret on a platform optimized for dampening microphonic resonances. A platform, however, is not optimum because an electret of nonuniform thickness and/or heat sink conditions will not be spatially uniform. The simplest electrical design uses two identical electrets with the anode of one connected in parallel with the cathode of the other. Multiple electrode schemes have been used on a single electret to reject microphonic signals. Domain engineering techniques have also been used. Domain engineering techniques in materials such as $LiNbO_3$ have required the use of an ion mill. This resulted in very small fragile detectors. Domain engineering in polymers such as polyvinyladine flouride has also been used, but such detectors do not have the same pyroelectric coefficient as those made from $LiNbO_3$ and $LiTaO_3$. They also result in detectors that do not have a highly uniform thickness.

Representative of the art is:

U.S. Pat. No. 4,967,082 (1990) to Cooke et al. discloses a thermal radiation detection apparatus comprising an array of pyroelectric detectors 1, 2, 3, 4 in which compensation is provided for the effect of ambient temperature changes on the detector outputs and also for dc offsets which occur in source follower impedance converters 13 that are necessarily used with each detector.

U.S. Pat. No. 4,963,741 (1990) to McMullin discloses a large area pyroelectric joulemeter for measuring the pulsed beam output of a laser.

U.S. Pat. No. 4,943,800 (1990) to Ikeda et al. discloses the method of mounting three pyroelectric detectors to eliminate microphonic noises caused by temperature variations.

U.S. Pat. No. 4,920,385 (1990) to Clarke et al. discloses electro-optical sensing of form type and other defects on surfaces such as sheet metal or plastic panels.

U.S. Pat. No. 4,792,682 (1988) to Endou et al. discloses a pyroelectric infrared temperature compensated detector. The system utilizes one operating area of the pyroelectric detector as an infrared detection area. Similar to the concept as disclosed in Fisher below, the compensation signal is obtained from other operating areas of the pyroelectric detector. Microphonic noises caused by vibration and temperature variations are reduced.

U.S. Pat. No. 4,629,319 (1986) to Clarke et al. discloses electro-optical sensing of form type and other defects on surfaces such as sheet metal or plastic panels.

U.S. Pat. No. 4,598,163 (1986) to Ito discloses a pyroelectric detector comprising a functional portion in which opposed electrodes 111 to 118 are formed on both surfaces of a pyroelectric-type substrate 101, and four light-receiving electrode portions a, b, c, and d are structured by the opposed electrodes 111 to 118. The light-receiving electrode portions a and c and the light-receiving electrode portions b and d are electrically connected alternately and in series, and the light-receiving electrode group A and the other light-receiving electrode group B are connected to have opposite polarities.

U.S. Pat. No. 4,593,456 (1986) to Cheung discloses a thermal detector array which includes a substrate layer with a pyroelectric layer attached to the substrate, a plurality of detector regions being defined in the pyroelectric layer by openings through the layer.

U.S. Pat. No. 4,542,294 (1985) to Tamura et al. discloses a method of producing a pyroelectric-type infrared detector comprising the steps of arranging two pyroelectric elements 25A and 35A polarized in opposite directions on support blocks 21A, and arranging, in combination, the support blocks 21A on which the pyroelectric elements 25A and 35A are arranged on a common base plate 40.

U.S. Pat. No. 4,532,424 (1985) to Cheung discloses a thermal detector array which includes a substrate layer with a pyroelectric layer attached to the substrate, a plurality of detector regions being defined in the pyroelectric layer by openings through the layer.

U.S. Pat. No. 4,441,023 (1984) to Doctor et al. discloses a dual pyroelectric crystal sensor suitable for infrared intruder alarms and the like having two separate closely-spaced identical pyroelectric crystal detectors connected in parallel opposition.

U.S. Pat. No. 4,224,521 (1980) to Fisher discloses in FIG. 1 a detector array and a circuit which sum the output of each detector with an average output signal obtained from all detectors. This technique serves to cancel microphonic noise caused by vibration and temperature variations.

U.S. Pat. No. 4,110,616 (1978) to Porter et al. discloses a pyroelectric detector which includes at least one pyorelectric element consisting of a pyroelectric material sandwiched between first and second electrodes and a semiconductor chip having a field effect transistor formed on one surface and having an electrical contact for the gate electrode of the transistor formed on the surface opposite to one surface.

U.S. Pat. No. 4,060,729 (1977) to Byers et al. discloses the concept of mounting two pyroelectric detector elements in adjacent configuration. Different or the same polarization of the elements are used to cancel noise signal created by temperature variations and vibration.

U.S. Pat. No. 3,453,432 (1966) to McHenry discloses the concept of placing an active pyroelectric detector adjacent to a compensating pyroelectric element to cancel undesirable signals generated due to substrate temperature changes.

What is also needed is a pyroelectric detector having adjacent domain reversed regions. What is needed is a pyroelectric detector having domain engineered regions to eliminate microphonic noise and/or enable position sensing. What is needed is a pyroelectric detector having a thick electret to simplify the manufacturing and augment the use of the detector by reducing the mechanical frailty present in the prior art detectors and eliminate the need for ion milling procedures. What is needed is a pyroelectric detector having an electrically conducting container and contiguous ground electrode which electrically isolates the signal electrode from electromagnetic interference. What is needed is a pyroelectric detector having a large detector area.

SUMMARY OF THE INVENTION

The main aspect of the present invention is to provide a pyroelectric detector having optimal acoustic nulling.

Another aspect of the present invention is to provide a pyroelectric detector capable of position sensing.

Another aspect of the present invention is to provide a pyroeletric detector having more than one domain orientation within a detector region.

Another aspect of the present invention is to provide a pyroelectric detector having an electret of uniform thickness.

Another aspect of the present invention is to provide a pyroelectric detector with regions that are uniformly poled.

Another aspect of the present invention is to provide a pyroelectric detector having a high resolution domain boundary.

Another aspect of the present invention is to provide a pyroelectric detector having a large detector area.

Another aspect of the present invention is to provide a pyroelectric detector that does not require the use of an ion mill for fabrication.

Another aspect of the present invention is to provide a pyroelectric detector packaged within a container that is connected electrically to ground and the ground electrode of the electret and that completely encloses the signal electrode.

Other aspects of this invention will appear from the following description and appended claims, reference being made to the accompanying drawings forming a part of this specification wherein like reference characters designate corresponding parts in the several views.

Using electric field poling at room temperature, the direction of the spontaneous polarization present in a z-cut $LiNbO_3$ electret is selectively reversed so that areas of equal and opposite sensitivity are created to produce a bicell pyroelectric detector. In the paraelectric phase above the Curie temperature, the Li atoms lie in an oxygen layer that is c/4 away from the Nb atom, and the Nb atoms are centered between oxygen layers. These positions make the paraelectric phase non-polar. As the temperature decreases from the Curie temperature, the elastic forces of the crystal become dominant and force the lithium and niobium ions into new positions. The charge separation resulting from this shift of ions relative to the oxygen octahedra causes $LiNbo_3$ to exhibit spontaneous polarization at any temperature below 1210° C.

The detector requires only a single set of electrodes; one electrode on the front surface and one on the back surface. Microphonic noise that is typical of monocell pyroelectric detectors is reduced in the present invention. The optical response of one half of the bicell detector area is equal and opposite to the other half within 1.2%. The microphonic suppression of the bicell pyroelectric detector of the present invention compared to a reference monocell pyroelectric detector was less than −36 dB from 10 Hz to 50 Hz and −118 dB at 35 Hz.

The pyroelectric detector element is constructed from a z-cut $LiNbO_3$ electret, measuring 15.5 mm square and 200 $\mu$m thick. Photolithography is used in the construction of the detector. Photolithography is well known in the semiconductor industry. It is a method of patterning desired features on a substrate. The method uses a light sensitive material called photoresist(PR). The PR is applied to the surface of the substrate in a known manner, where it is baked. The desired pattern is then transferred to the PR by exposing it to a UV light through a mask of the desired pattern. After it is exposed it is developed. Depending upon the method chosen, both of which are well known, the exposed PR is either developed away or left in place.

Domain reversal is accomplished by applying an electric field of 24.5 kV/mm across the electret. The region that is domain reversed is confined to the photolithographically patterned open area in the photoresist. The resulting domain reversed area is a semi-circle of approximately 6 mm radius. To create the pyroelectric detector element, circular nickel electrodes 9.5 mm in diameter and 25 nm thick are deposited on either side of the electret. The detector element is mounted in a container using electrically conducting epoxy.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
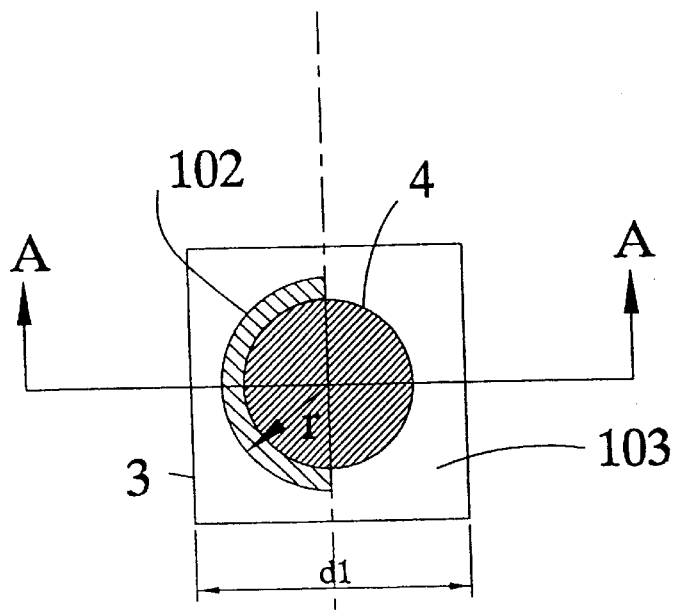
FIG. 1 is a top plan view of the electret.
Figure 7:
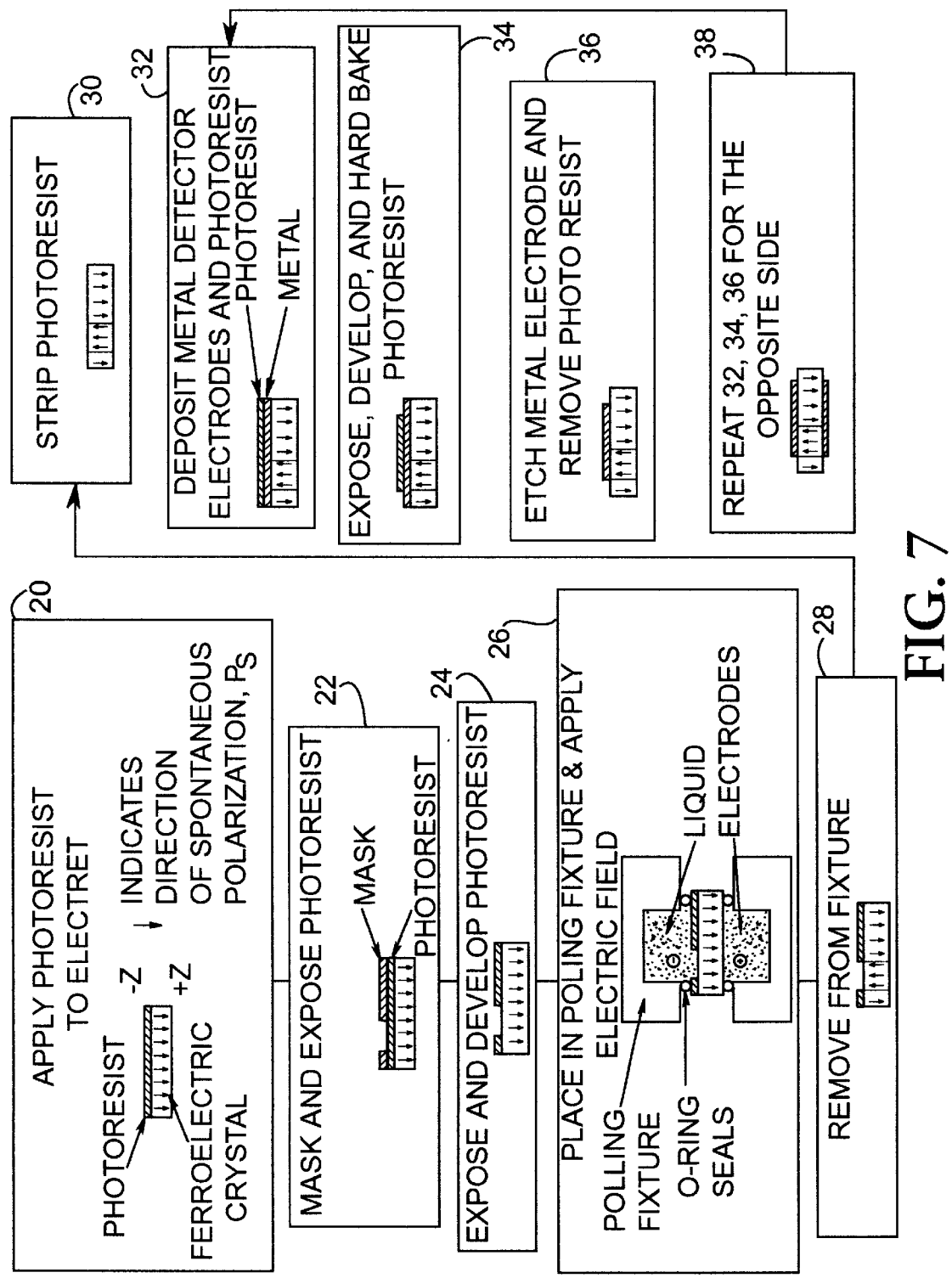
FIG. 7 is a flowchart of the steps to prepare the detector electret as described in the preceding figures.

FIG. 1 is a plan view of the electret 3. Domain reversed region 102 is impressed by application of an electric field, described in the following paragraphs. The electrode 4 is shown attached to the electret 3 over the domain reversed region 102 and a portion of the original domain region 103. The pyroelectric detector element is constructed from a z-cut $LiNbO_3$ or $LiTaO_3$ electret measuring 15.5 mm square and 200 $\mu$m thick, shown on FIG. 1 and FIG. 2 as d1 and d2, respectively. Using electric field poling at room temperature, the direction of the spontaneous polarization is selectively reversed in domain reversed region 102 of FIG. 1 to produce the bicell pyroelectric detector. Selective domain reversal to re-orient the spontaneous polarization of one-half of the detector is accomplished by; 1) photolithographically opening a desired region(s) in the photoresist; 2) clamping electret 3 in an acrylic fixture that allows independent electrical contact of the faces by means of liquid electrodes as shown in FIG. 7 box 4. O-rings are used to confine the liquid electrodes in the poling fixture; and 3) applying a 24.5 kV/mm electric field across the electrodes such that the field is orientated with the more positive pole on the +z-face of the electret and the more negative pole on the −z-face of the electret. The applied electric field may be in the range of 21 kV/mm to 30 kV/mm. The resulting domain-reversed area is a semi-circle of approximately 6 mm radius shown as r on FIG. 1. The detector region may have a width in the range of 4 µm to 100 mm. Circular metal electrodes, 2 and 4, typically nickel, are then deposited on either side of the electret 3 as described in FIG. 7 using methods known in the art. The electrodes have a thickness in the range of 1 µm to 100 µm and a diameter in the range of 4 µm to 100 mm. In the preferred embodiment the electrodes are typically 9.5 mm in diameter and 25 nm thick. For the preferred embodiment the detector requires only a single set of electrodes.

Figure 2:
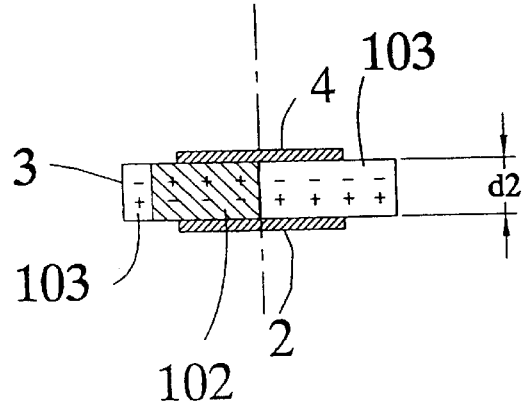
FIG. 2 is a cross-sectional view along line A—A of FIG. 1.

FIG. 2 is a cross-sectional view along line A—A in FIG. 1. Electrodes 2 and 4 are attached to opposite sides of the electret 3. They are preferably made of metal, such as nickel, or conductive oxide. The electret 3 has a thickness (d2) in the range of 10 µm to 1 mm. Original domain region 103 has a direction of spontaneous polarization in the electret 3 as shown. Once the electric field is applied to the electret 3 as described in FIG. 7, a domain reversed region 102 is created which has a spontaneous polarization direction opposite that of the original domain region 103.

Figure 3:
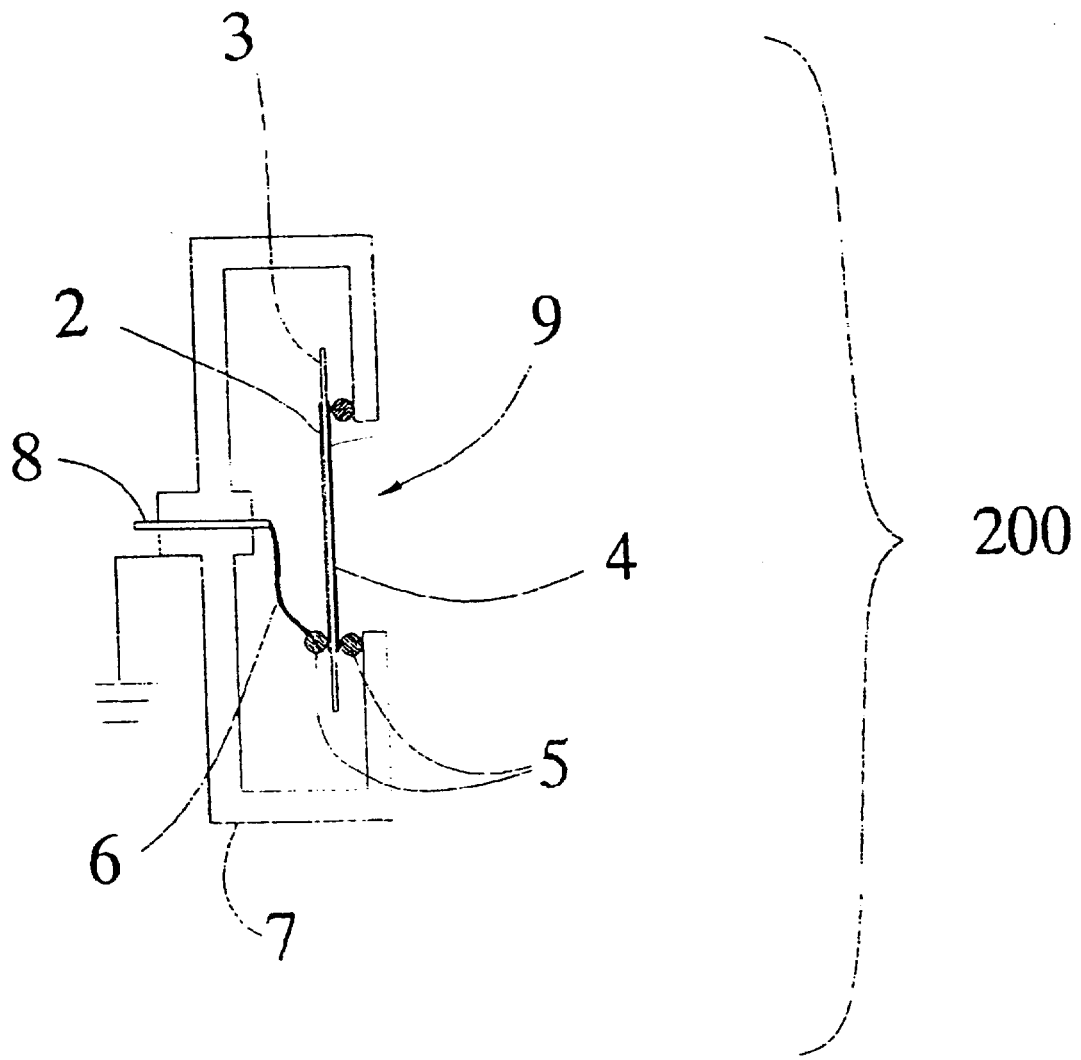
FIG. 3 is a cross-sectional view of a pyroelectric detector assembly, the preferred embodiment.

FIG. 3 is a cross-sectional view of a pyroelectric detector assembly 200. The detector element is attached electrically and mechanically to the container 7. For example, electrically conducting epoxy 5 may be used on the perimeter of the container opening 9. As a result, the area defined by electrode 2 is not attached to a rigid heat sink and, therefore, provides a more spatially uniform response to optical input. Container 7 is grounded, which provides electromagnetic shielding for the signal wire 6. The detector signal output is obtained at signal feedthrough 8.

Figure 4:
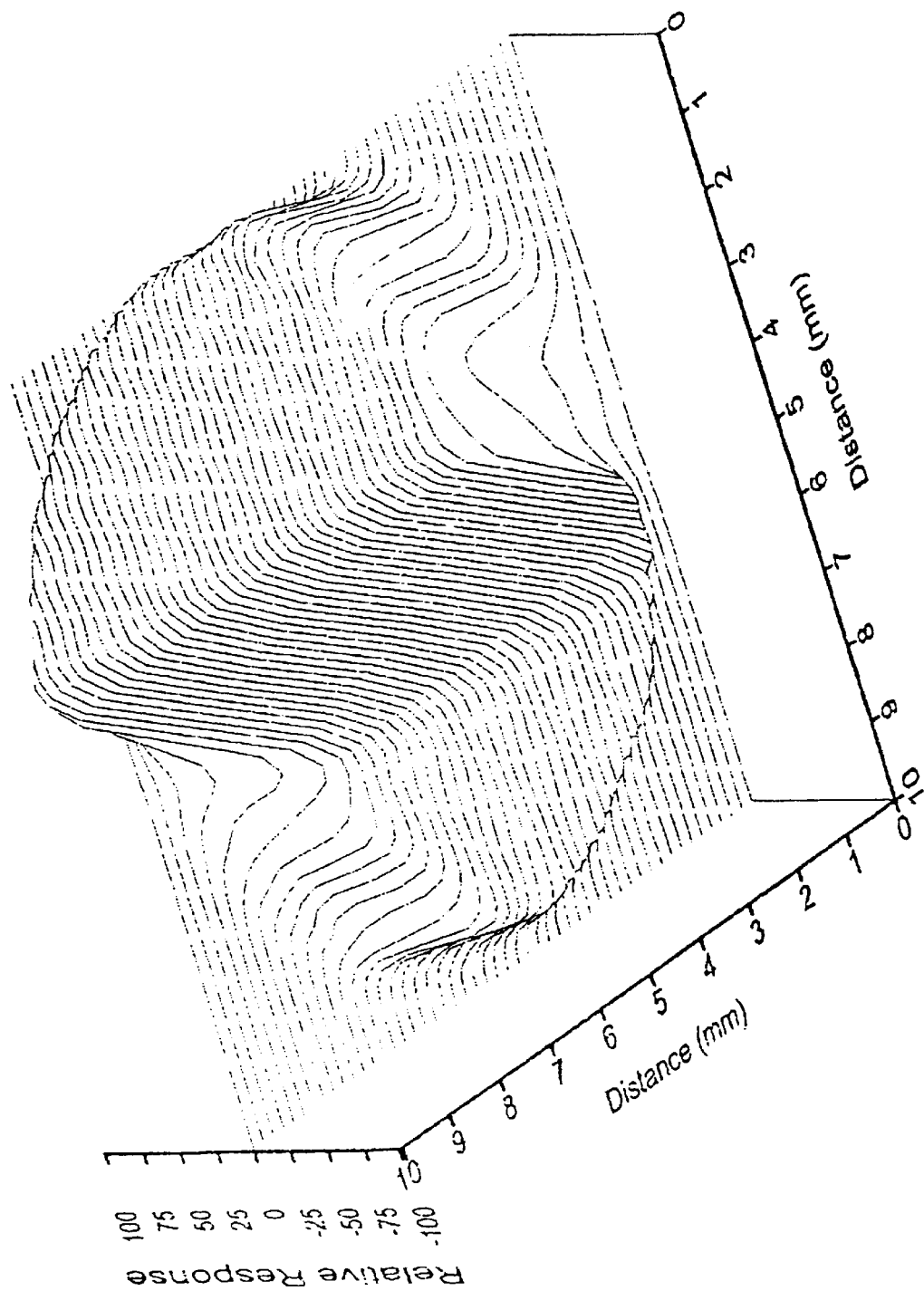
FIG. 4 is a perspective view of a surface map graph of the spatial responsivity.

FIG. 4 is a perspective view of a surface map of the responsivity of the detector showing the opposing response of the domain reversed region compared to the original domain region on the electret.

Figure 5:
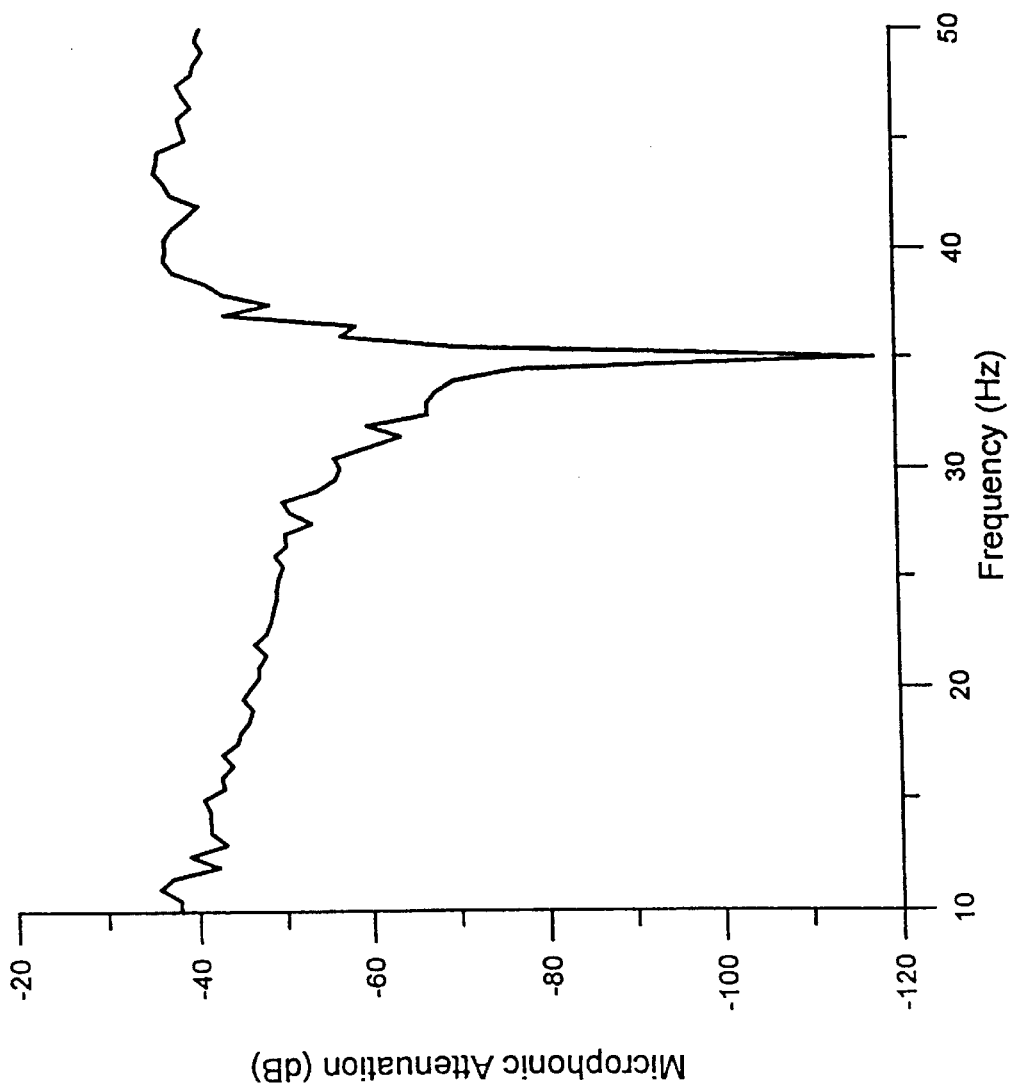
FIG. 5 is a graph of the microphonic frequency response in the detector.

FIG. 5 shows a graph of the microphonic frequency attenuation of the detector. The detector current response is obtained by modulating the acoustic or optical input and measuring the electrical output with a current mode preamplifier and a lock-in amplifier. The pyroelectric current $i_{pyro}$ may be expressed by:

$$i_{pyro} = (j\omega p/b)\exp(j\omega t)\int T(x)dx \qquad (1)$$

Equation (1) is given to point out that the pyroelectric current depends on the electret thickness b and the electret temperature T(x) averaged over the electret thickness. The remaining parameters in Equation (1) are defined as the pyroelectric coefficient per unit area p, time t, and angular frequency $\omega = 2\pi f$, where f is the modulation frequency of the optical input. The piezoelectric current ipiezo is given by:

$$i_{piezo} = KfA\sigma \qquad (2)$$

As Equation (2) indicates, the piezoelectric current response is proportional to the electrode area A, the acoustic frequency f, and the stress σ on the electret. The stress σ on the electret is the result of sound pressure. The proportionality constant K is a function of the elastic moduli, the geometry and behavior for different vibration modes, and the piezoelectric tensor elements.

The spatial uniformity is measured as follows. The detector was attached to a 2-axis translation stage. The stage was driven by DC servo-motors and controlled using an optical encoder and a computer. The light from a 674 nm laser diode was focused to a spot diameter of approximately 500 µm and was used as a probe. The laser was operated at 0.5 mW and was chopped at 75 Hz. As the probe was scanned across the detector's aperture at 200 µm intervals, the detector signal was sampled and recorded. A surface map of these data is shown in FIG. 4. The data were normalized to the value of the highest response of any location on the detector. The average response of the domain-reversed half of the bicell detector was −95.3%, with a standard deviation of 1.6%. The average of the other half was 94.5% with a standard deviation of 1.5%.

The relative acoustic frequency response was measured using a loudspeaker located 45 mm away and facing the detector aperture. The loudspeaker output was coupled to the pyroelectric detector through the surrounding air. The pyroelectric detector output was sampled and recorded over the frequency range 10 to 50 Hz. Low frequency microphonics are of interest because the minimum noise equivalent power (NEP) is typically well below 100 Hz.

The microphonic response measurement was performed on the bicell pyroelectric detector and on the reference monocell pyroelectric detector. These data are represented by the microphonic signal attenuation:

$$R(f) = 20 \log(i_b(f)/i_s(f)) \qquad (3)$$

In Equation (3), $i_s(f)$ is the piezoelectric frequency response of the monocell detector and $i_b(f)$ is the piezoelectric frequency response of the bicell detector. The quantities $i_s(f)$ and $i_b(f)$ are both piezoelectric current signals that are each proportional to the pressure acting on the pyroelectric element. The acoustic frequency response is shown in FIG. 5. The uncertainty of the data varies from a few tenths of one percent to nearly 10% at 35 Hz where the bicell current response approaches zero. The bicell pyroelectric optical detector displayed good spatial uniformity, a simple electrode configuration, and excellent microphonic noise suppression. The optical response of either half of the monolithic bicell is equal and opposite to the other within 1.2%. The standard deviation of the response of each half is less than 1.6%. The acoustic frequency response showed −118 dB microphonic suppression at 35 Hz. The low noise at 35 Hz is a function of the package and poling pattern which may be varied to shift the minimum.

Figure 6:
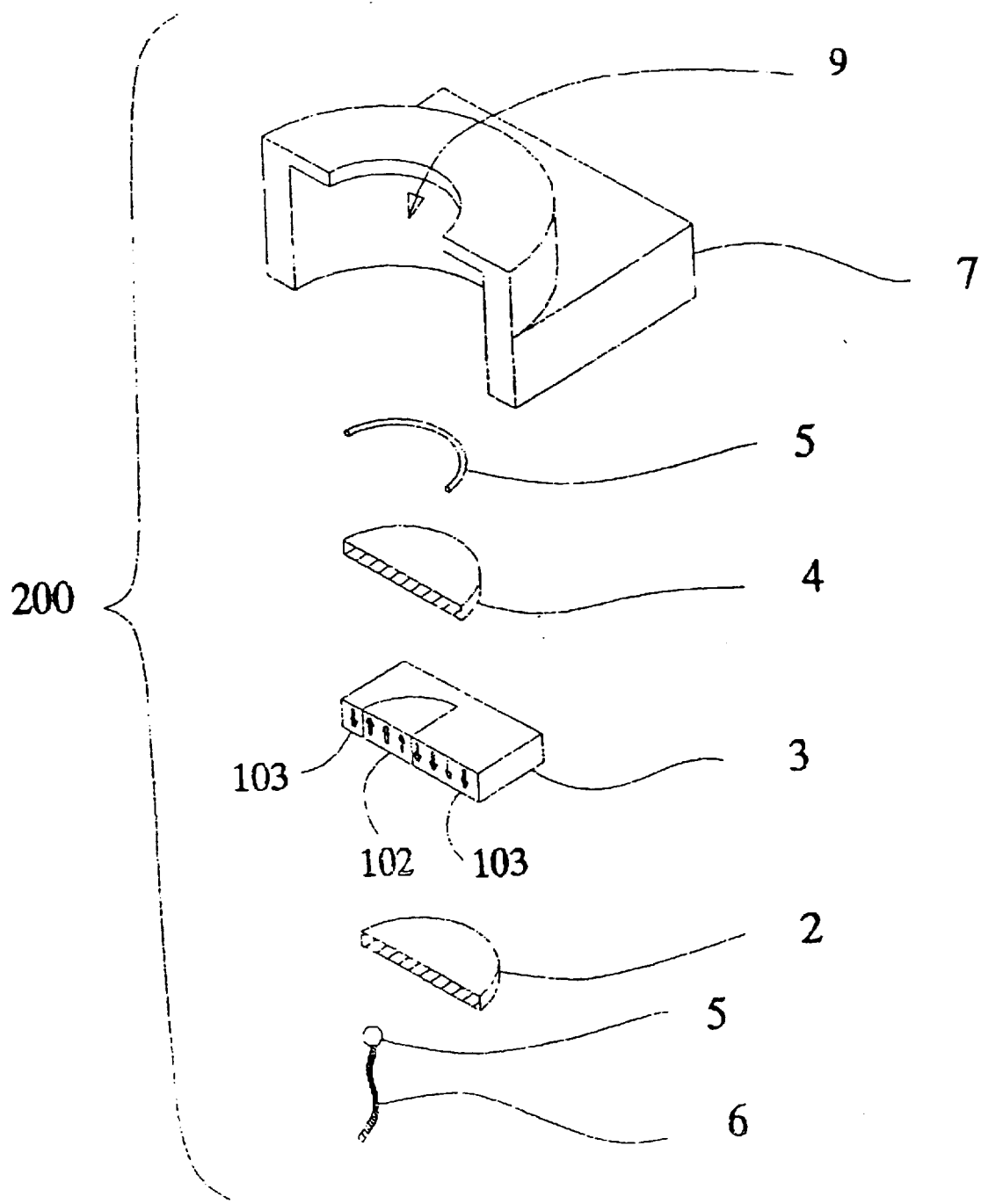
FIG. 6 is an exploded view of the detector assembly shown in FIG. 3.

FIG. 6 is an exploded view of the detector assembly 200. Electrodes 2 and 4 are shown on opposite sides of electret 3. An electrically conducting epoxy 5 may be used to attach electret 3 to container 7. Signal wire 6 is attached to an outer perimeter of electrode 2 and may be attached using electrically conducting epoxy. Electrode 4 is aligned with opening 9. The domain reversed region 102 may have a radius in the range of 2 µm up to 50 mm, which upper range is limited by available electret size. The spontaneous polarization in original domain region 103 is shown adjacent to the reversed spontaneous polarization in domain reversed region 102. The arrows show the direction of polarization with the head of the arrows pointing to the positive charge.

FIG. 7 is a flowchart of the steps to construct the detector electret. The photoresist is applied to the electret, at step 20. The photoresist is then masked, exposed to UV light, and developed at steps 22 and 24. The electret is then placed in the poling fixture as described in FIG. 1 and the electric field is then applied to the electret at step 26. The applied electric field may be in the range of 21 kV/mm to 30 kV/mm at room temperature. This results in the domain reversed region described in the preceeding figures. The electret is then removed from the fixture at step 28. The photoresist is then stripped from the electret at step 30. The electrode material is then deposited on the electret at step 32. A layer of photoresist is then applied on top of the metal layer. The photoresist is then developed and hard-baked at step 34. The exposed metal is then etched and the photoresist is removed, revealing the electrode at step 36. Steps 30, 32, 34 and 36 are then repeated to apply an electrode to the side opposite from that applied above at step 38. This method may be used to construct detector electrets having multiple domain reversed detector regions.

Figure 8A:
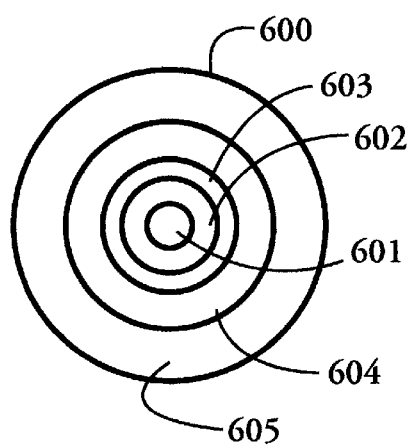
FIGS. 8A–8D are a plan view of four alternate embodiments showing multiple detector region patterns.
Figure 8B:
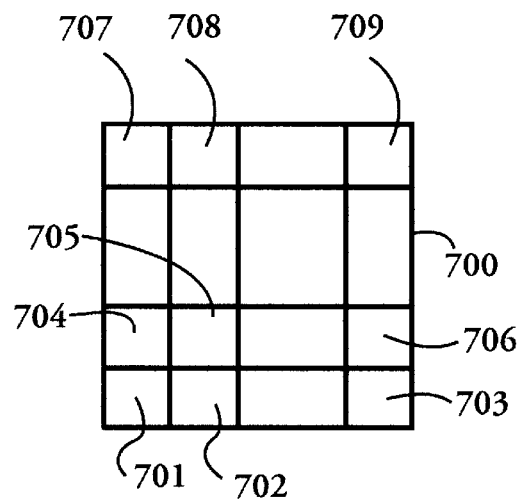
Figure 8C:
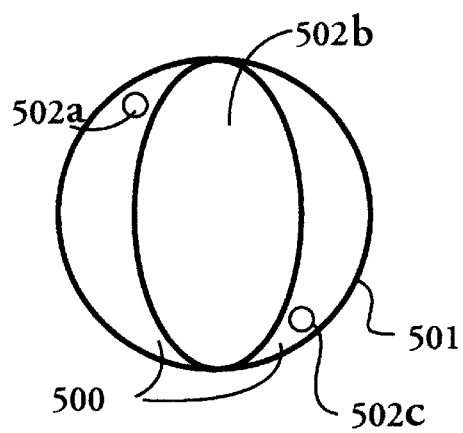
Figure 8D:
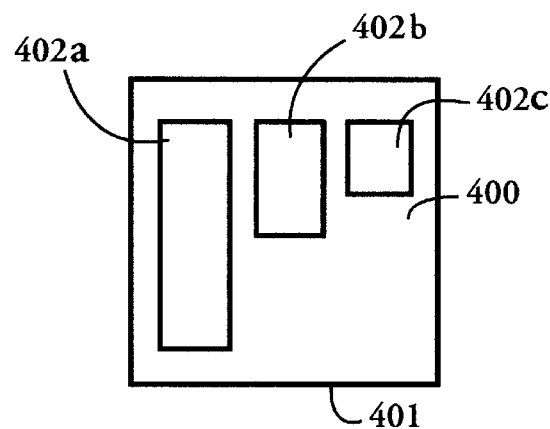

FIGS. 8A–8D are plan views of four alternate embodiments showing domain engineered multiple detector region patterns. As shown in FIG. 8C, electret 501 depicts multiple domain regions 500 and 502a, 502b, 502c to accomodate resonant modes of the electret 501. The direction of the domain region 500 can be either that of the original domain or the reversed domain with the direction of domain region 502 taking the opposite sense of that of domain region 500. Any two adjacent regions are analogous to original domain region 103 and domain reversed region 102 in FIG. 6. As shown in FIG. 8D electret 401 depicts multiple asymmetrical domain reversed regions 402a, 402b, 402c and original domain region 400. Any two adjacent regions are analogous to original domain region 103 and domain reversed region 102 in FIG. 6. As shown in FIG. 8A electret 600 depicts annular domain regions 601–605 of concentric rings of alternating domain direction about a central circle. Any two adjacent annular regions are analogous to original domain region 103 and domain reversed region 102 in FIG. 6. The spontaneous polarization of the domain regions starts at the center region and may begin with either the original or domain reversed direction. The number of domain regions can be in the range of 2 to 25000, given an annular width range of 50 mm to 2 $\mu$m maximum size being limited to electret radius. The width of each individual domain region can be but need not be equal.

As shown in FIG. 8B electret 700 has an array of domain regions 701–709. The regions can be square, rectangular, trapezoidal, triangular, semi-circular, or any other geometric shape. Any of the domain regions 701–709 can have the original domain direction or the reversed domain direction. Each adjacent original domain and reversed domain region, for example 706 and 703, is analogous to the adjacent domain regions 103 and 102 as shown in FIG. 2. The pattern resulting from such an array of domain regions could be constructed to resemble a checker-board pattern, to produce rows of alternating domains, to produce columns of alternating domains, or to produce a random distribution of original and reversed domain regions. The size of the smallest dimension of any region is in the range of 2 $\mu$m to 50 mm, with the upper limit dependent on electret size. The number of domain regions is in the range of 2 to 2,500,000,000 with the upper limit dependent on the domain region size and electret size.

The domain reversed regions are fabricated as described in FIGS. 1,2,3 and 7. For acoustic nulling use, the signal electrode must cover a portion of at least one original domain region and a portion of at least one adjacent domain reversed region such that areas of equal and opposite acoustic sensitivity are created. For position sensing the signal electrode may cover a region or regions containing a single domain direction or it may cover a region or regions containing both domain directions. Therefore, the array of regions 701–709 may contain one or more signal electrodes.

Figure 9:
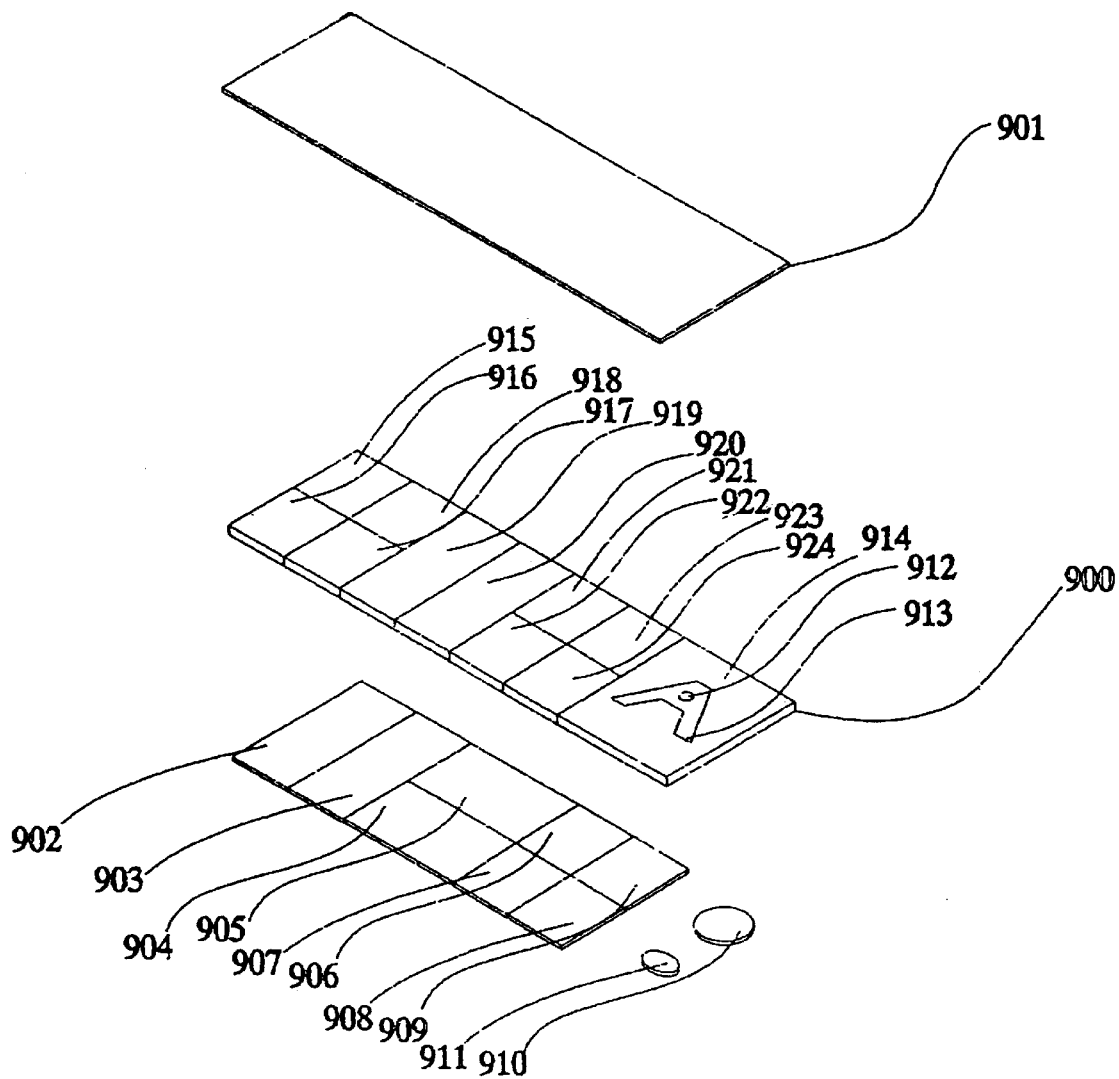
FIG. 9 depicts an alternate embodiment of the invention with mutiple regions.

FIG. 9 depicts an alternate embodiment of the invention. Electret 900 has numerous original domain regions 912, 914, 915, 917, 919, 922, and 923 and domain reversed regions 913, 916, 918, 920, 921, and 924. Ground electrode 901 contacts the entire front surface of the electret 900. In a subassembly, electrode 902 spans domain regions 915 and 916. In this configuration the subassembly can operate as a position sensor with acoustic nulling or simply as an acoustically nulled pyroelectric detector. Other subassemblies comprise electrode 903 and domain regions 917 and 918; electrode 904 and portions of domain regions 919 and 920; electrode 905 and portions of domain regions 919 and 920; electrode 906 and domain region 921; electrode 907 and doamin region 922; electrode 908 and domain region 924; electrode 909 and domain region 923. Electrode 910 and 911 may cover parts of domain regions 912, 913 and 914. In the embodiment which does not have a container, each electrode 902 thru 911 will also have a signal wire (not shown). Electrode 901 is grounded in this embodiment.

Figure 10:
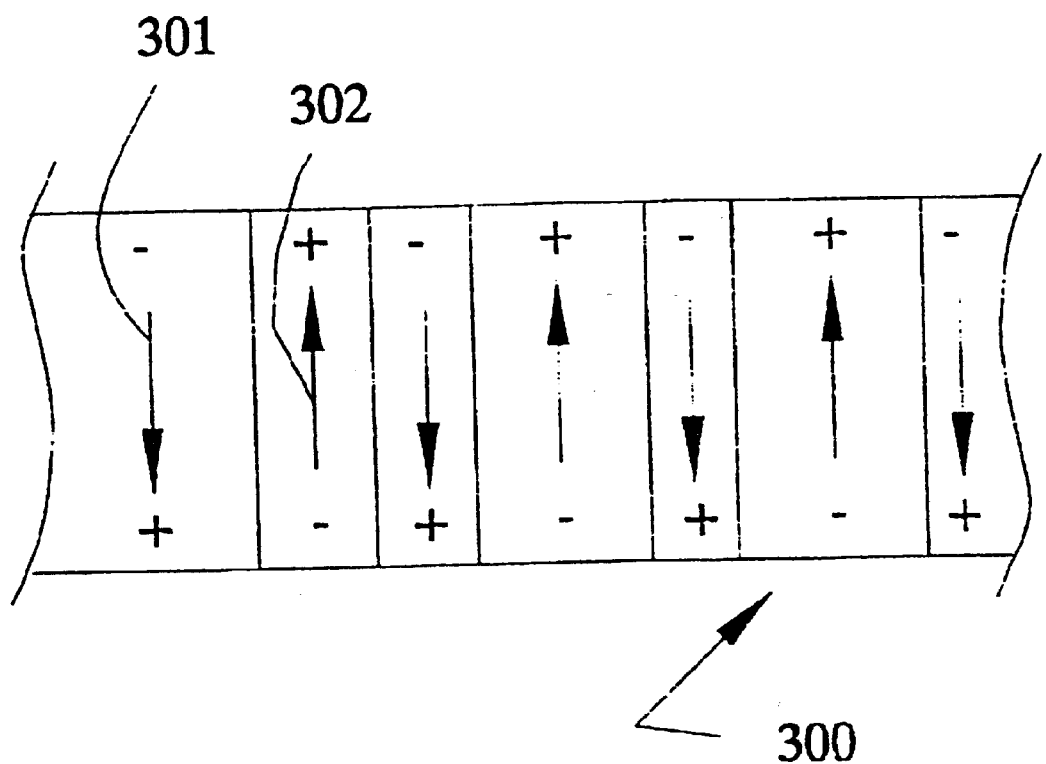
FIG. 10 is a cross-sectional view of a portion of z-cut electret.

FIG. 10 is a cross-sectional view of a portion of z-cut electret 300. Electret 300 is multiple domain having domain direction 301 and domain direction 302. This represents the native arrangement of domains in a piece of ferroelectric material. In most cases the electrets are supplied having a single domain. A single domain is achieved by applying an electric field along the z direction. This aligns all domains in the electret in the same direction.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A pyroelectric detector having reduced sensitivity to acoustic noise comprising:

a z-cut electret having a front surface and a rear surface and having a first and second domain region;

said first domain region having a spontaneous polarization;

said second domain region having a spontaneous polarization opposite to the spontaneous polarization of said first domain region, said spontaneous polarization aligned in said second domain region by application of a electric field across said electret to form high resolution domain boundaries, said first and second domain regions thereby comprising a detector region;

a first electrode attached to said front surface spanning substantially equal portions of each domain region; and a second electrode attached to said rear surface spanning said domain regions that are the same domain regions that are spanned by said first electrode to define a detector region and to reduce sensitivity to said acoustic noise by conductively combining the acoustic responses of said first and second domain regions;

an electrically conductive container connected to a ground potential that receives said electret, said container having an opening for receiving incident radiation and held at ground potential to provide electrical shielding; and said first electrode being conductively connected to said container about a perimeter of said opening in said container such that said first electrode is aligned with said opening in said container to receive incident radiation and said first electrode is grounded to said electrically conductive container.

2. The pyroelectric detector as claimed in claim 1, wherein said electric field is in the range of 21 kV/mm to 30 kV/mm.

3. The pyroelectric detector as claimed in claim 2, wherein said electret has a thickness in the range of 10 $\mu$m to 1 mm.

4. The pyroelectric detector as claimed in claim 3, wherein said detector region further comprises a smallest dimension in the range of 4 $\mu$m to 100 mm.

5. The pyroelectric detector as claimed in claim 4, wherein a domain region has a smallest dimension in the range of 2 µm up to 50 mm.

6. The pyroelectric detector as claimed in claim 5, wherein said first electrode and said second electrode each further comprise metal electrodes; and said second electrode having a signal wire having a first end connected to a perimeter of said second electrode and a second end connected to a signal feedthrough on said container.

7. The pyroelectric detector as claimed in claim 6 further comprising:

electrically conducting epoxy for connecting a perimeter of said first electrode to said container; and for connecting said first end of said signal wire to a perimeter of said second electrode.

8. The pyroelectric detector as claimed in claim 7, wherein said electret comprises $LiNbO_3$.

9. The pyroelectric detector as claimed in claim 8, wherein the acoustic responsivity of said first domain region covered by said first electrode is equal to the acoustic responsivity of said second domain region covered by said first electrode.

10. The pyroelectric detector as claimed in claim 7, wherein said electret comprises $LiTaO_3$.

11. The pyroelectric detector as claimed in claim 10, wherein the acoustic responsivity of said first domain region covered by said first electrode is equal to the acoustic responsivity of said second domain region covered by said first electrode.

12. The pyroelectric detector as claimed in claim 6, wherein said electret comprises $LiNbO_3$.

13. The pyroelectric detector as claimed in claim 12, wherein the acoustic responsivity of said first domain region covered by said first electrode is equal to the acoustic responsivity of said second domain region covered by said first electrode.

14. The pyroelectric detector as claimed in claim 6, wherein said electret comprises $LiTaO_3$.

15. The pyroelectric detector as claimed in claim 14, wherein the acoustic responsivity of said first domain region covered by said first electrode is equal to the acoustic responsivity of said second domain region covered by said first electrode.

16. A method of nulling acoustic noise in a pyroelectric detector formed from a z-cut single crystal electret comprising the steps of;

generating two domain regions in said electret having opposite spontaneous polarizations and high resolution domain boundaries;

providing an electrode that covers approximately equal portions of said two domain regions to define a detector region, said portions of said two domain regions covered by said electrode having approximately equal and opposite acoustic sensitivity;

combining electrical charges generated by said two domain regions in response to said acoustic noise to null said acoustic noise.

17. A method of detecting the position of a light beam using a bicell pyroelectric detector formed from a z-cut single crystal electret comprising the steps of:

generating two domain regions in said electret having opposite spontaneous polarizations and high resolution domain boundaries;

providing electrodes on first and second surfaces of said electret that define a detector region, said electrodes covering approximately equal portions of said two domain regions;

irradiating one of said electrodes with a light beam;

detecting changes in current upon movement of said position of said light beam on said one of said electrodes.

18. A method of detecting the position of a beam of electromagnetic radiation using a multicell pyroelectric detector formed from a z-cut single crystal electret that nulls acoustic noise comprising the steps of:

generating multiple domain regions in said electret having alternating opposite spontaneous polarizations and high resolution domain boundaries, such that multiple domain regions have approximately equal and opposite acoustic and pyroelectric sensitivity;

providing multiple pairs of electrodes on said multiple domain regions that define detector regions such that each pair of said multiple pairs of electrodes cover at least two domain regions of opposite polarity;

irradiating said multiple electrodes with an electromagnetic beam;

detecting changes in current in said multiple pairs of electrodes to determine a position of said beam.

19. A pyroelectric detector that is capable of detecting the position of an electromagnetic beam and substantially reducing acoustic noise comprising:

a z-cut single crystal electret;

two domain regions formed in said electret having opposite spontaneous polarizations and high resolution domain boundaries;

a pair of electrodes that cover approximately equal portions of said two domain regions to define a detector region, said portions of said two domain regions covered by said electrodes having approximately equal and opposite acoustic and pyroelectric sensitivity such that acoustic noise is substantially reduced by combining acoustic noise responses of said portions ot said two domain regions covered by said electrodes and current generated in said pair of electrodes indicates said position of said electromagnetic beam on said pyroelectric detector.

20. The pyroelectric detector of claim 19 wherein said electret is formed from $LiNbO_3$.

21. The pyroelectric detector of claim 19 wherein said electret is formed from $LiTaO_3$.

22. The pyroelectric detector of claim 19 further comprising:

additional domain regions formed in said electret that have alternating opposite spontaneous polarizations and high resolution domain boundaries;

additional pairs of electrodes that cover approximately equal portions of said additional domain regions.

* * * * *